United States Patent [19]
Beri et al.

[11] Patent Number: 6,141,018
[45] Date of Patent: Oct. 31, 2000

[54] METHOD AND SYSTEM FOR DISPLAYING HYPERTEXT DOCUMENTS WITH VISUAL EFFECTS

[75] Inventors: Sanjay Beri, Ottawa, Canada; Benjamin W. Slivka, Clyde Hill, Wash.

[73] Assignee: Microsoft Corporation, Redmond, Wash.

[21] Appl. No.: 08/815,818

[22] Filed: Mar. 12, 1997

[51] Int. Cl.[7] .................................................. G06F 17/21
[52] U.S. Cl. ........................................... 345/473; 707/513
[58] Field of Search ..................................... 707/526, 513; 463/31; 705/40; 345/333, 473

[56] References Cited

U.S. PATENT DOCUMENTS

| | | | |
|---|---|---|---|
| 5,347,295 | 9/1994 | Agulnick et al. | 345/156 |
| 5,572,643 | 11/1996 | Judson | 709/218 |
| 5,572,651 | 11/1996 | Weber et al. | 345/326 |
| 5,905,492 | 5/1999 | Straub et al. | 345/333 |
| 5,983,208 | 11/1999 | Haller et al. | 705/40 |

OTHER PUBLICATIONS

Author, Marquee, http;//www.microsoft.com/workshop/author/newhtml/htmlr020.htm, Apr. 28, 1997, pp. 24,25.
Jim O'Donnell, Eric Ladd and Mark Brown, Using Microsoft Internet Explorer 3, Que Corporation, 1996, Indianapolis, Indiana, Chapters 2, 3, 20 and 25.
Gavron, Jacquelyn and Joseph MOran. "How to Use MIcrosoft (TM) Windows(TM) NT4." (Emeryville: Ziff David Press, 1996) xiv, 14, 15, 130–131, 138–142, Jan. 1, 1996.
Lamay, Laura and Michael G. Moncur. "Laura Lemay's Web Workshor: Javascript(TM)." (Indianapolis: Sams.net, 1996) 222, 163–168, Jan. 1, 1996.
Richard, Kevin. "PC Magazine." Apr. 9, 1996, 1–5.
Foley, James D. and others "Computer Graphics: Principles and Practice." 2d. (Reading: Addison–Wesley, 1990) pp. 1057–1080, Jan. 1, 1990.
"Interactive Home." (Jan. 1, 1996) pp. 1–4.
Simsom, Garfinkel, L. "The Christian Science Monitor." (Mar. 28, 1996) pp. 1–8.
Gibbs, Mark. "Network World." (Feb. 19, 1996) pp. 1–12.
Powell, James E. "Windows Magazine." (Nov. 1, 1996) pp. 1–4.
"The Seybold Report on Internet Publishing." (Oct. 1, 1996) pp. 1–9.
Marquee Active OC; Apr. 18, 1996.
HTML reference; Apr. 28, 1997; ww.microsoft.com/workshop/author/newhtml/htmlr020.htm.
Special Edition Using Microsoft Internet Explorer 3 written by Jim O'Donnell, Eric Ladd, and Mark Brown; Copyright 1996; www.mcp.com/que.
HTML Reference; May, 1997; www.microsoft.com/author/newhtml/htmlref.htm.

Primary Examiner—James P. Trammell
Assistant Examiner—John Leonard Young
Attorney, Agent, or Firm—Banner & Witcoff, Ltd.

[57] ABSTRACT

A computer system for displaying an image of a hypertext document in an animated marquee. The computer system includes a hypertext document viewer that receives an identification of a hypertext document and generates an image of the hypertext document: The computer system also includes a marquee object that receives an identification of an hypertext document, that invokes the hypertext document viewer to generate an image of the hypertext document, and that displays the image of the generated hypertext document. The computer system also includes a browser that receives an identification of an hypertext document that contains an indication of the marquee object along with a reference to another hypertext document and that invokes the hypertext document viewer sending the identification of the hypertext document. When the hypertext document viewer receives the identification of the hypertext document that contains the indication of the marquee object, the hypertext document viewer sends the reference to the other hypertext document to the marquee object. The marquee object generates an image of the other hypertext document and displays the generated image of the other hypertext document in an animated manner.

56 Claims, 9 Drawing Sheets

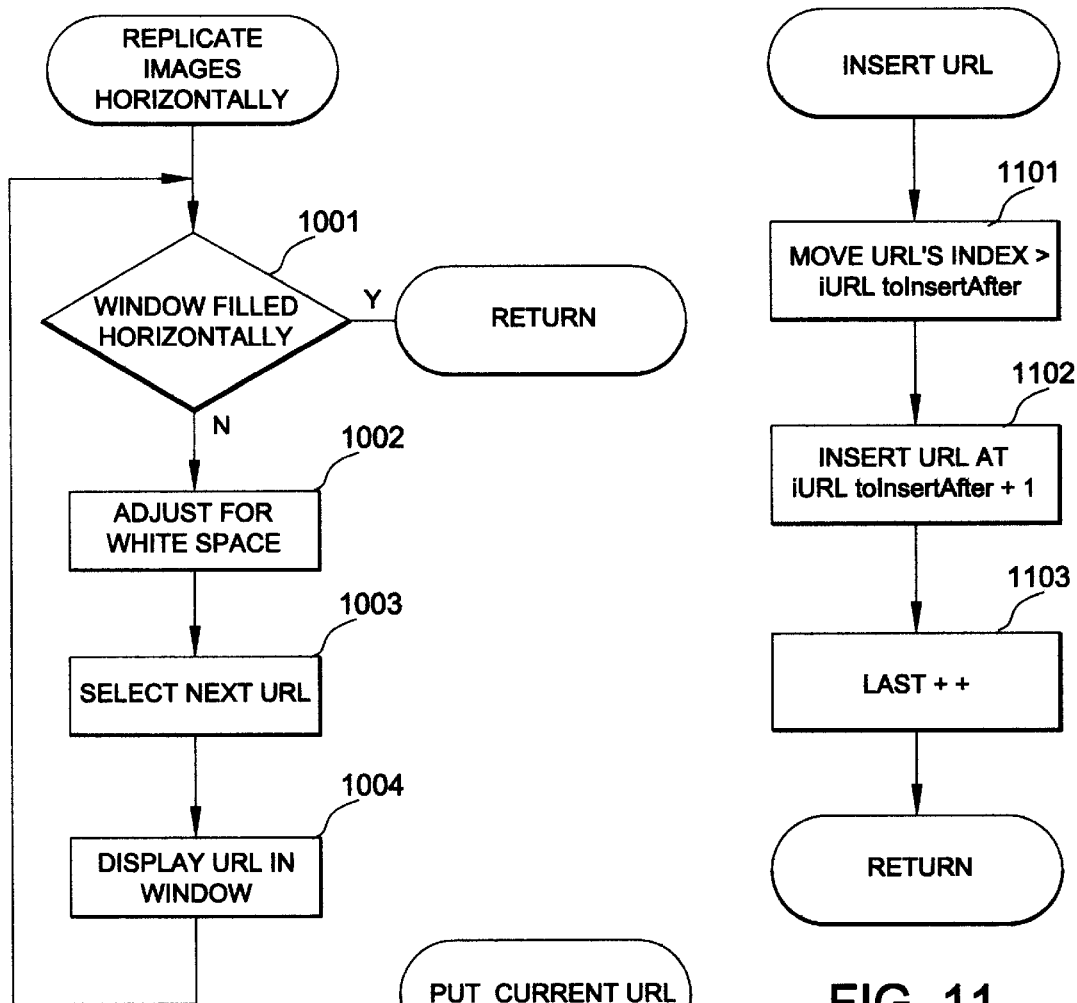
FIG. 10
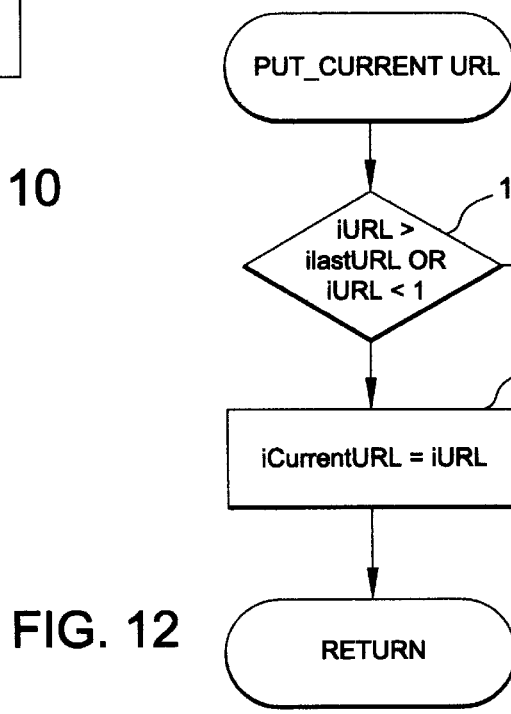
FIG. 11
FIG. 12

METHOD AND SYSTEM FOR DISPLAYING HYPERTEXT DOCUMENTS WITH VISUAL EFFECTS

TECHNICAL FIELD

The present invention relates generally to the field of displaying hypertext documents, and in particular, to animating the display of hypertext documents.

BACKGROUND OF THE INVENTION

The Internet comprises a vast number of computers interconnected so that information can be exchanged among the computers. Various protocol and other interface standards have been developed for the Internet so that each computer will understand information of the other computers. The World-Wide Web ("WWW") is a subset of the Internet computers that support the Hypertext Transfer Protocol ("HTTP"). HTTP is an application-level protocol for distributed, collaborative, hypertext information systems that defines the format and contents of messages and responses sent between client programs ("clients") and server programs ("servers") over the Internet. In addition, HTTP is a generic, stateless, object-oriented protocol which can be used for many other tasks, such as name servers and distributed object management systems, through various extensions.

The Internet facilitates information exchange between servers and clients that are located throughout the world. Each computer on the Internet has a unique address (e.g., "acme.com"). When a client wishes to access a resource (e.g., document), the client specifies a Uniform Resource Locator ("URL") that uniquely identifies the computer on which the server executes and the resource. An example of a URL is "http://acme.com/page1." In this example, the server is identified by "acme.com" and the resource is identified by "page1." The URL has two parts: a scheme and a scheme-specific part. The scheme identifies the high-level protocol through which the information is to be exchanged, and the scheme-specific part contains additional information that identifies the server computer and the resource. The "http" at the beginning of the example URL identifies the scheme and indicates that the remainder of the URL should be interpreted according to HTTP. The remainder specifies a server computer (e.g., "acme.com") followed by additional information that is specific to the server. For example, the additional information may be a path name within the server computer to a Hypertext Markup Language ("HTML") document.

HTML is a page description language that is used to specify the format and layout of Web pages. When a Web browser receives a URL that identifies a Web page, it retrieves via the WWW an HTML document that describes that Web page. The browser then processes that HTML document and displays the Web page that is described by the document. HTML and various extensions to HTML provide a rich set of tags that define the formatting and content of the page to be displayed. The tags can be as simple as indicating that text is to be displayed in italics or as complex as indicating that a computer program is to be executed to provide the content of a portion of the Web page. The Web pages are usually defined to include graphical components. For example, an HTML document may contain a URL that identifies a bitmap that is to be displayed as part of the Web page. When a Web browser encounters such a URL within an HTML document, the browser uses the URL to locate and retrieve the bitmap and then display the bitmap as part of the Web page.

Microsoft Corporation has defined various extension to HTML. One such extension is known as a <marquee> tag. The <marquee> tag indicates that certain text is to be scrolled within a marquee window on a Web page. The attributes of the <marquee> tag specify the size of the marquee window and the direction and speed of scrolling. The <marquee> tag thus provides a visual effect that is similar to the electronic marquees found on some buildings that display the headline news.

Another extension to HTML is known as an <object> tag. An <object> tag specifies computer code that is to be executed to generate content for the Web page. The <object> tag includes parameters that are to be provided to the computer code to control its execution. The computer code is an ActiveX object (i.e., ActiveX control) that supports an interface standard that is described in *Understanding ActiveX and OLE*, by David Chappell and published by Microsoft Press in 1996, which is hereby incorporated by reference. The <object> tag includes information that identifies the object and the size of the object window in which the object can display the content that it generates. The ActiveX standard defines a mechanism through which an object can notify the browser of certain events. For example, if a user clicks on the object window, the object could notify the browser that a click was received. The browser could then take some action. The HTML document may even include instructions in a scripting language, such as Visual Basic (VB) Scripting, that are to be executed when an object generates an event. When the browser is notified of an event, it then executes the script for that event. The ActiveX standard also defines a mechanism by which the browser can set attributes of the object. The object exposes its functionality via OLE automation.

The <marquee> tag provides a useful, but limited mechanism, for scrolling text on a Web page. It would be desirable to have a mechanism that provides sophisticated animation of arbitrary information on a Web page.

SUMMARY OF THE INVENTION

The present invention provides a method and system for displaying an arbitrary image in an animated marquee. The image can be displayed with various visual effects. For example, the image can be displayed to bounce off each border of the marquee window in which it is displayed. The image can also be displayed so that replications of the image continually scroll across the marquee window. In one embodiment, the animated marquee is controlled by an ActiveX object (i.e., marquee object) that is specified by an <object> tag an HTML document. The <object> tag identifies the image and specifies various parameters to control the animation. The marquee object exposes various methods for setting the parameters and issues events to notify a Web browser of various conditions.

BRIEF DESCRIPTION OF THE DRAWINGS

FIG. 10 is a flow diagram of an implementation of a routine to replicate the images horizontally.

FIG. 11 is a flow diagram of an implementation of a routine to insert a URL into the list of URLs.

FIG. 12 is a flow diagram of an implementation of a routine to change the current URL.

DETAILED DESCRIPTION OF THE INVENTION

The present invention provides a method and system for providing an animated marquee for display of an arbitrary image as part of a Web page. In one embodiment, the hypertext document that defines the Web page identifies the image to be displayed in a marquee window, identifies the size of the marquee window, and identifies the type of animation to be applied when the image is displayed. The image to be displayed in the marquee window is identified by a URL. The image can be animated by scrolling either in the vertical or horizontal direction. The scroll style can be set to either a circular or a bounce visual effect. When the scroll style is circular one copy of the image is followed by another copy of the image in a continuous manner. When the scroll style is bounce and the leading edge of the image is scrolled so that it intersects a border of the marquee window, the direction of the scroll is reversed so that the image appears to bounce off that border of the marquee window. When scrolled in the reverse direction, the direction of the scrolling is again reversed when the leading edge of the image intersects the other border of the marquee window. The leading edge of the image is the edge that is first in the direction of scrolling. That is, when the image is being scrolled to the left, the leftmost edge of the image is the leading edge. The image can be of arbitrary complexity. Indeed, the image itself can be a hypertext document. Various parameters such as the scroll style, scroll direction, the number of times the image is to be bounced or scrolled, and the speed of the scrolling, can be set for the animated marquee. In addition, the parameters can be set to indicate whether the URL is to be drawn immediately or progressively, to indicate the amount of wide spaces between successive copies of the image, and to indicate a zoom parameter. The animated marquee can also display a sequence of images rather than just one image. Each image is identified by a URL. When the scroll style is circular, each image is scrolled to follow another image in a continuous manner. When the scroll style is bounce, the user can click on the marquee window to select the next image. The next image is then displayed in the marquee window to replace the previous image.

Figure 1C:
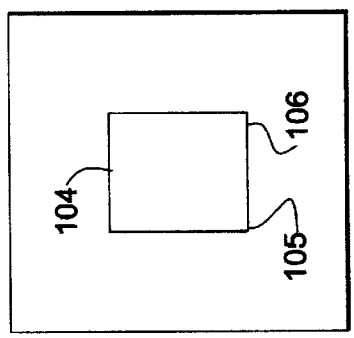
FIGS. 1A–1F illustrate an animated marquee with the bounce visual effect.
Figure 1F:
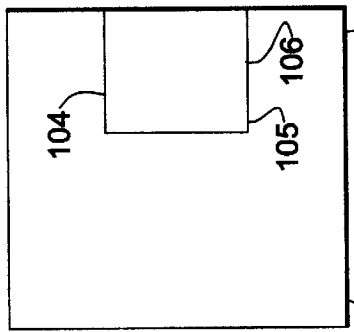
Figure 1B:
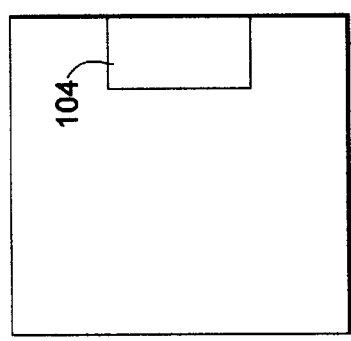
Figure 1E:
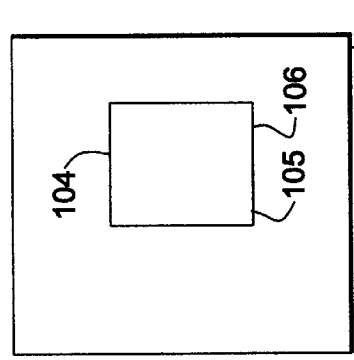
Figure 1A:
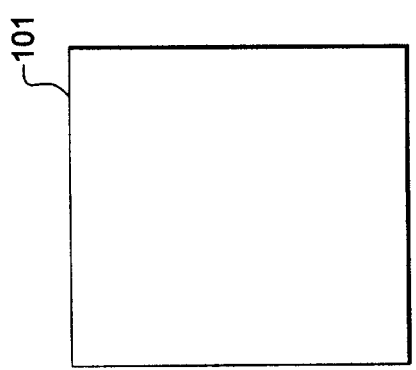
Figure 1D:
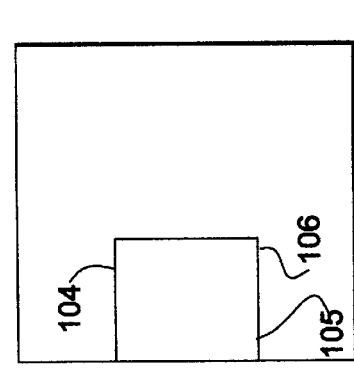

FIGS. 1A–1F illustrate an animated marquee with the bounce visual effect. The marquee widow 101, which would typically be a portion of a Web page, contains borders 102 and 103 that are perpendicular to the direction of scrolling. The image 104 contains edges 105 and 106. FIG. 1B shows image 104 as it is scrolling horizontally to the left. When the image 104 is scrolled horizontally to the left, the edge 105 is referred to as the leading edge and edge 106 is referred to as the trailing edge. Also, when the image is being scrolled horizontally to the left, the border 102 is referred to as the leading border and the border 103 is referred to as the trailing border. As shown in FIG. 1C, image 104 is smaller than the window 101 in the horizontal direction. As shown in FIG. 1D, the leading edge of the image has intersected the leading border of the marquee window. When the intersection occurs, the direction of scrolling is reversed as shown in FIG. 1E. That is, image 104 is then scrolled horizontally from the left to the right. Since the direction of scrolling has been reversed, edge 106 is now referred to as the leading edge and edge 105 is now referred to as the trailing edge. As shown in FIG. 1F, the leading edge 106 intersects the leading border 103, the direction of scroll is again reversed so the image is then scrolled to the left. This reversal of scrolling direction when the leading edge of the image intersects a border gives the visual effect of the image bouncing off the borders of the marquee window. When a user clicks on the marquee window, assuming multiple images have been identified, the next image is displayed in the marquee window.

Figure 2C:
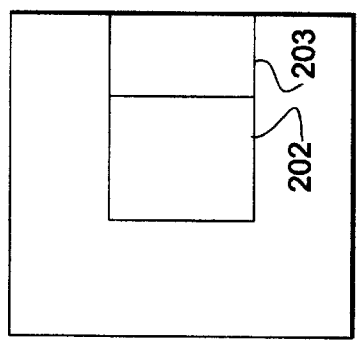
FIGS. 2A–2F illustrate an animated marquee with the circular visual effect.
Figure 2F:
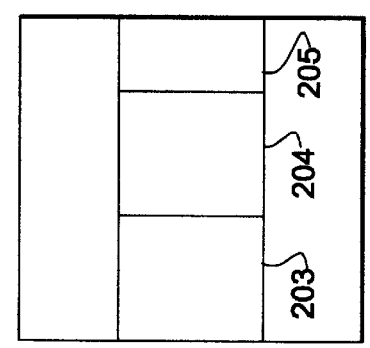
Figure 2B:
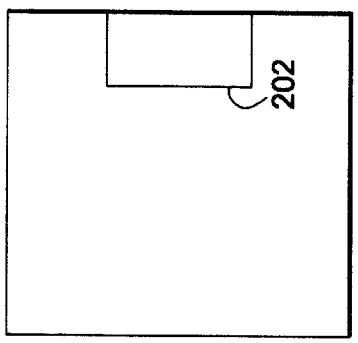
Figure 2E:
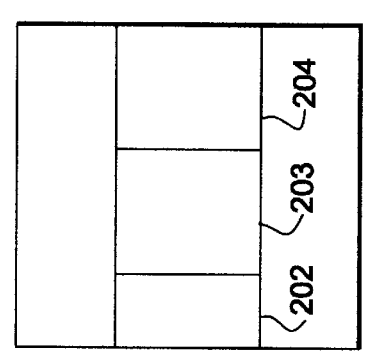
Figure 2A:
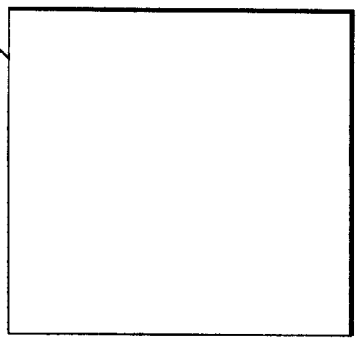
Figure 2D:
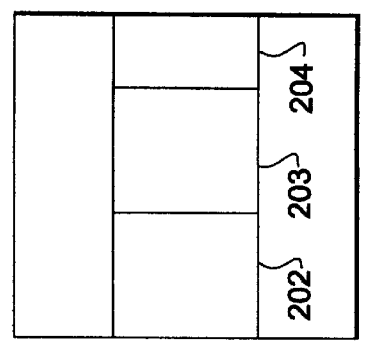

FIGS. 2A–2F illustrate an animated marquee with a circular visual effect. As shown in FIG. 2B, a copy 202 of the image is being scrolled from the right to the left. As shown in FIG. 2C, as the copy 202 of the image becomes fully visible within the marquee window 201, another copy 203 of the image is scrolled from the right to the left. As shown in FIG. 2D, when copies 202 and 203 are further scrolled to the left, a portion of copy 204 of the image becomes visible. The scrolling continues to the left as shown in FIG. 2E. Eventually, copy 202 scrolls past the left border of the marquee window and a portion of copy 205 of the image becomes visible to the right. In an embodiment with multiple images, one image is followed by the next image and so on. When the last image is scrolled, it is followed by another copy of the first image.

Figure 3C:
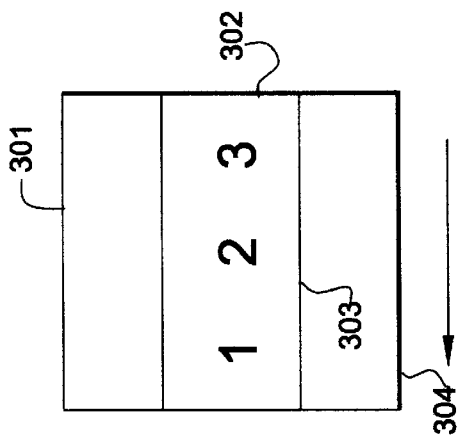
FIGS. 3A–3F illustrate an animated marquee with the bounce visual effect when the image is larger in the direction of scroll than the marquee window.
Figure 3F:
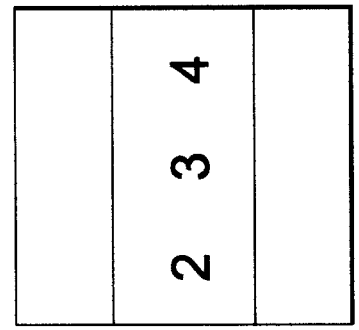
Figure 3B:
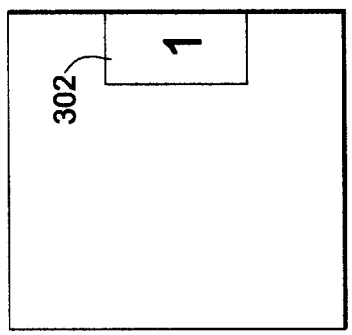
Figure 3E:
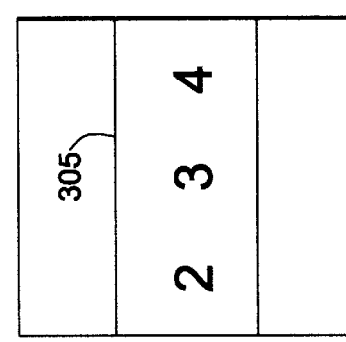
Figure 3A:
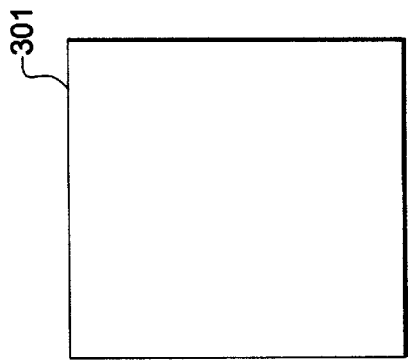
Figure 3D:
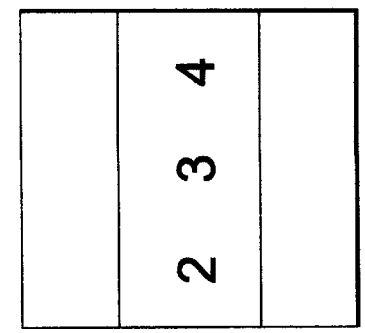

FIGS. 3A–3F illustrate an animated marquee with the bounce visual effect when the image is larger in the direction of scroll than the marquee window. The image 302 is larger horizontally than the marquee window 301. Consequently, the entire image cannot be visible simultaneously within the marquee window. Thus, if the direction is reversed when the leading edge intersects the trailing edge, the entire image would never be displayed. Thus, when the image is larger than the marquee window in the direction of scroll, the reversal of direction occurs when the trailing edge intersects the trailing border. In this way, the entire image is displayed before the image bounces. Alternatively, the reversal of direction could occur when the trailing edge of the image intersects the leading border of the marquee window to give a slightly different bounce visual effect. FIG. 3B illustrates the start of scrolling of the image 302. In this example, the image contains the numbers 1, 2, 3, and 4 to illustrate which portion of the image is currently visible. As shown in FIG. 3C, the leading edge 303 of the image intersects the leading border 304 of the marquee window. However, the direction of scroll is not reversed at this point because the entire image has not been yet displayed. FIG. 3D illustrates continued scrolling in the left direction. FIG. 3E illustrates that the trailing edge 305 of the image intersects the trailing border 306 of the marquee window. At this point, the entire image has been displayed and the direction of scroll is reversed to provide the visual effect of a bounce. FIG. 3F illustrates the scrolling of the image in the reverse direction.

Figure 4:
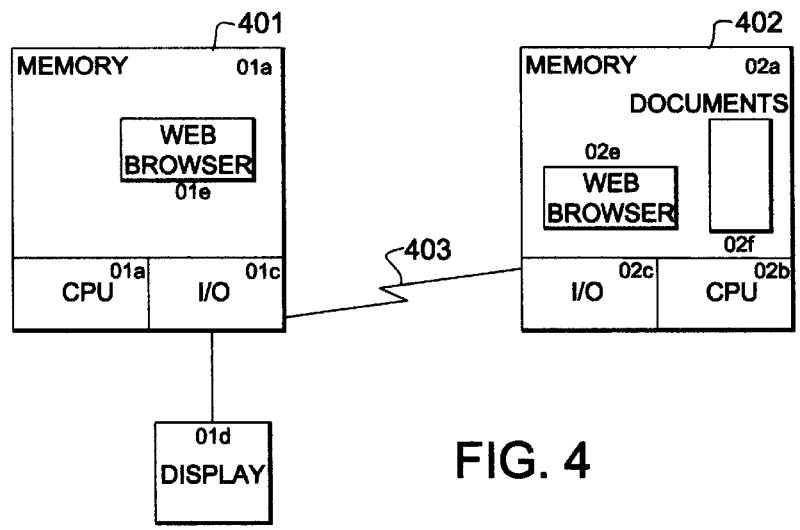
FIG. 4 is a block diagram illustrating a computer system for practicing the present invention.

FIG. 4 is a block diagram illustrating a computer system for practicing the present invention. The computer system 401 contains a memory 401A, a central processing unit 401B, and an I/O interface 401C. The memory contains a Web browser 401E which receives and displays hypertext documents on display 401D. The computer system 401 is connected to one or more computer systems 402. Computer system 402 contains a memory 402A, a central processing unit 402B, and an I/O interface 402C. The memory 402A contains a Web server 402E and various hypertext documents 402F. When the Web browser requests a document through connection 403, the Web server provides that document to the Web browser. The Web browser then displays a Web page as defined by the hypertext document. The Web browser 401E supports the animated marquee of the present invention.

Figure 5:
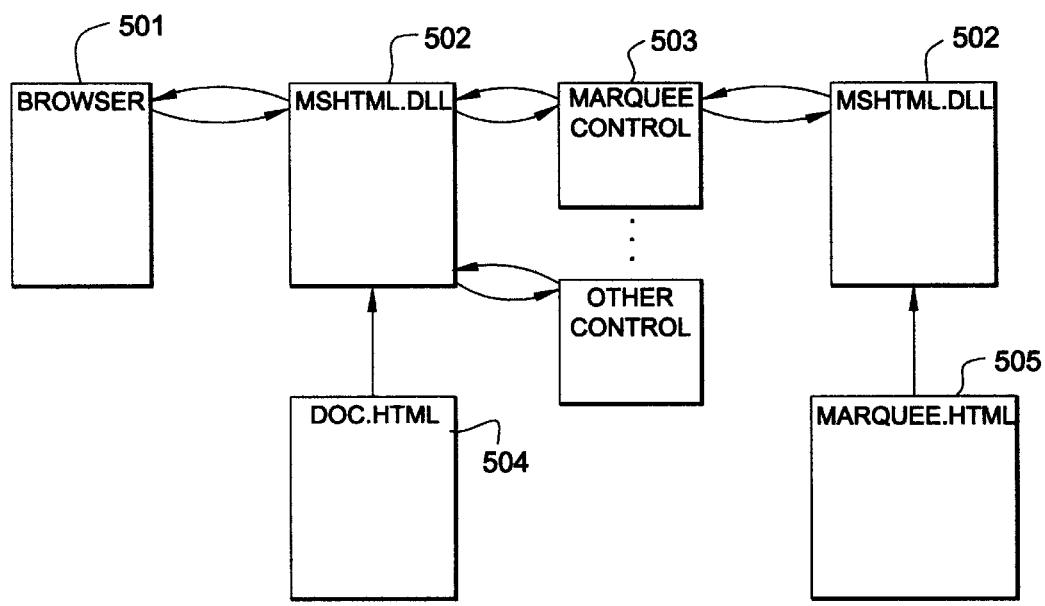
FIG. 5 is a block diagram illustrating the interrelation between various components for generating the animated marquee.

In one embodiment of the present invention, the animated marquee is implemented as an ActiveX object (i.e., a marquee object) that is identified by an <object> tag in an HTML document. The marquee object has various attributes whose values can be specified by the parameters of the <object> tag. FIG. 5 is a block diagram illustrating the interrelation between various components for generating the animated marquee via a marquee object. The Web browser 501 invokes the HTML viewer 502 to display an HTML document 504. The HTML viewer is implemented as a dynamic link library that is loaded by the Web browser. When the HTML document 504 contains an <object> tag that identifies the marquee object class, the HTML viewer instantiates the marquee object 503. The HTML viewer then sets the attributes of the marquee object as identified by the parameters in the object tag using OLE Automation to invoke methods of the marquee object. The attributes include the URL of the image to be displayed in the marquee window. When the URL identifies another HTML document, the marquee object then invokes the HTML viewer (as indicated by the second copy of the HTML viewer 502) to generate the image. The marquee object then applies the animation to the image and displays the animated image in the marquee window. The following table lists the attributes that can be set along with a description of the attributes.

| ATTRIBUTE | DESCRPTION |
| --- | --- |
| ScrollStyleX | Horizontal scroll style: "circular" or "bounce." |
| ScrollStyleY | Vertical scroll style: "circular" or "bounce." |
| ScrollDelay | Time in milliseconds between each movement of the image in the marquee window. |
| LoopsX | Number of times the image scrolls horizontally if ScrollStyleX is "circular," or number of times the image bounces horizontally if ScrollStyleX is "bounce." |
| LoopsY | Number of times the image scrolls vertically if ScrollStyleY is "circular," or number of times the image bounces vertically if ScrollStyleY is "bounce." |
| ScrollPixelsX | Number of pixels to move the image horizontally in the marquee window each ScrollDelay. |
| ScrollPixelsY | Number of pixels to move the image vertically in the marquee window each ScrollDelay. |
| URL | URL of the image. |
| DrawImmediately | Flag indicating to progressiveiy render the image. |
| Whitespace | Amount of white space between images. |
| PageFlippingOn | If multiple URLs; indicates that the next image is to be displayed when the marquee window receives a click. |
| Zoom | Percentage of the original size of the image. |
| WidthOffPage | Width in pixels of the image. |

The ScrollStyleX and ScrollStyleY parameters have two possible values: "circular" and "bounce." For the ScrollStyleX parameter, "circular" indicates that the image will keep scrolling from either the left or right (depending on the sign of the ScrollPixelsX parameter), as if it were wrapping around. For the ScrollStyleY parameter, "circular" indicates that the image will keep scrolling from either the top or bottom (depending on the sign of the ScrollPixelsY parameter), as if it were wrapping around. For both parameters, "bounce" indicates that the image will hit a border of the marquee window and change directions. However, there are two different interpretations of bounce depending on the image size. If the image is smaller than the marquee window, the leading edge of the image will intersect the leading border of the marquee window and the image will change directions. If the image is bigger than the marquee window, however, the direction is changed when the trailing edge of the image comes into view.

The ScrollDelay parameter indicates the time in milliseconds between each movement of the image in the marquee window. Once the image has stopped scrolling, this is the time between image refreshes. If the image is not finished loading or formatting, the image will still be refreshed every ScrollDelay. Also, if the hypertext document has a META tag with an expiry date, then the marquee object will change the image according to the META tag arguments.

The LoopsX and LoopsY parameters indicate the number of times the image scrolls or bounces depending on the scroll style. If the LoopsX or LoopsY parameter is set to zero, then the image will "slide." That is, the image will scroll in a certain direction and stop as soon as the leading edge of the image intersects the leading border of the marquee window. If the LoopsX or LoopsY parameters are greater than zero, then after that number of loops, the part of the image that is displayed depends on the scroll style. If the ScrollStyleX parameter is "circular," the very left of the image is aligned with the left of the marquee window. If the ScrollStyleX parameter is "bounce," then the image is positioned where the last bounce occurs. A similar effect occurs when looping in the vertical direction. If the LoopsX or LoopsY parameters are −1, the image scrolls forever.

The ScrollPixelsX and ScrollPixelsY parameters indicate the number of pixels that the image is moved every ScrollDelay. A positive number indicates a scroll to the right or the bottom, and a negative number indicates a scroll to the left or the top.

If the DrawImmediately parameter is set, the image will scroll before the image is fully loaded (i.e., formatted). This gives the effect of progressive rendering.

The Whitespace parameter indicates the number of pixels of whitespace between scrolling the images.

The PageFlippingOn parameter is used to indicate whether the next image will be displayed, when multiple URLs have been identified to the marquee object. If not set, all the specified URLs will scroll right after each other (like one image) with the appropriate whitespace. If set, at any one time, only one URL will be scrolled, but when the user clicks the right mouse button on the marquee window, the next image will be scrolled. In one embodiment, only one URL of an image can be identified in the <object> tag. The marquee object exposes various methods that the Web browser can invoke to set the other URLs.

The Zoom parameter indicates a percentage by which the image being scrolled is to be reduced/enlarged. The one-to-one aspect ration is maintained on "zoomed" pages. A value of −1 indicates the image is resized to fit in the marquee window (one-to-one aspect ration not necessarily kept as a result).

The WidthOfPage parameter specifies the width in pixels to format image.

The marquee object notifies the HTML viewer when various events occur. These events include the start of image display, the end of image display, an indication of the bounds, indication of a scroll, or an indication that the left mouse button has been pressed. When the Web browser receives an event and the HTML document contains an event handler (e.g., in VB Script) for that event, the Web browser invokes a scripting engine to execute the event handler. These events are described below.

Void OnStartOfImage (void)

This event is issued just prior to the first time the image is displayed in the marquee window.

void OnEndOfImage (unsigned char HorizontalOrVertical)

This event is issued when the image has been completely scrolled. For example, it can be used to let the event handler change the contents of another control after the image has stopped moving (e.g., if LoopsX=N, it is issued when N loops are completed). Since the horizontal and vertical scrolling could end at different times (i.e., different values for the parameters LoopX and LoopY), which one has ended is indicated by the returned value HorizontalOrVertical. The character 'H' indicates horizontal and the character 'V' indicates vertical. This event is issued for slides when the image "sticks."

void OnBounce (unsigned char SideBouncedOff)

This event is issued only when the scroll style is "bounce" and the image bounces off a border. The border it bounces off is returned in SideBouncedOff ('L' for left, 'R' for right, 'T' for top, and 'B' for bottom).

void OnScroll (unsigned char HorizontalOrVertical)

This event is issued each time the marquee object is about to scroll the image. Once again, HorizontalOrVertical ('H' or 'V') indicates whether the horizontal or vertical scrolling is about to begin again. It is not issued for bounces or slides and the first time the image is scrolled.

void OnLMouseButtonDown (void)

This event is issued when the left mouse button is pressed in the marquee window.

The marquee object exposes various methods via OLE Automation for setting and getting each of the parameters. In addition, the marquee object exposes a function to retrieve the current height of the image being scrolled and the current width of the image being scrolled. The marquee object maintains a list of URLs that are to be displayed in the marquee window and provides methods for maintaining the list. The following functions allow an event handler to manage the list of URLs.

STDMETHOD(insertURL)(THIS__intiURLtoInsertAfter, BSTR bstrURL)

This method inserts a new URL, bstrURL, after the existing URL at position iURLtoInsertAfter. If iURLtoInsertAfter equals 0, the method inserts the URL at the head of the list. If iURLtoInsertAfter is greater than the number of URLs in the list, the URL is added to the end of list.

STDMETHOD(deleteURL)(THIS__inti URLtoDelete)

This method removes the URL at index iURLtoDelete from the list. If iURLtoDelete is 0 or greater than the number of URLs in the list, the method deletes all the URLs.

STDMETHOD(queryURL)(THIS__int iURLtoGet, BSTR FAR* pbstrURL)

This method retrieves the URL at index iURLtoGet from the list and returns it in pbstrURL.

STDMETHOD(queryURLCount)(This__intFAR* pcURL)

This method returns the number of URLs in the list.

STDMETHOD(get__CurrentURL)(THIS__intFAR* pnCurrentURL); STDMETHOD(put__CurrentURL)(THIS__intnCurrentURL)

These methods set and get the current URL. The current URL changes when in PageFlipping mode and the user right clicks on the marquee window.

IViewObject::Draw

The implementation of the IViewObject::Draw function of the HTML viewer renders the currently loaded HTML page into the display context passed in using the RECT passed in as the bounding rectangle. The coordinates of the currently loaded HTML page can be retrieved using the IMarqueeInfo interface. The IMarqueeInfo interface is a private communication line between the marquee object and HTML viewer. The IMarqueeInfo::GetDocCoords method finds the width and height of the currently loaded HTML page. The method formats the text on the page to the pixel count given in parameter WidthToFormatPageTo.

The following setting of the parameters indicate how the described visual effect is specified.

Scroll From Left to Right
<PARAM NAME="ScrollStyleX" VALUE="Circular">
<PARAM NAME="LoopsX" VALUE=Number of times to scroll>
<PARAM NAME="ScrollPixelsX" VALUE=100>
<PARAM NAME="ScrollPixelsY" VALUE=-0>
Slide From Left
<PARAM NAME="LoopsX" VALUE=>
<PARAM NAME="ScrollPixelsX" VALUE=100>
<PARAM NAME="ScrollPixelsY" VALUE=-0>
Slide Image From Bottom Only When Finished Formatting and Rendering
<PARAM NAME="LoopsY" VALUE=0>
<PARAM NAME="ScrollPixelsX" VALUE=0>
<PARAM NAME="ScrollPixelsY" VALUE=-100>
<PARAM NAME="DrawImmediately" VALUE=0>
Scroll From Right To Left Twice and Top to Bottom Indefinitely (Diagonal scroll)
<PARAM NAME="ScrollStyleX" VALUE="Circular">
<PARAM NAME="ScrollStyleY" VALUE="Circular">
<PARAM NAME="LoopsX" VALUE=2>
<PARAM NAME="LoopsY" VALUE=-1>
<PARAM NAME="ScrollPixelsX" VALUE=-100>
<PARAM NAME="ScrollPixelsY" VALUE=100>
Bounce Image Shrunk to 30% Five Times Horizontally Starting From Right
<PARAM NAME="ScrollStyleX" VALUE="Bounce">
<PARAM NAME="LoopsX" VALUE=5>
<PARAM NAME="ScrollPixelsX" VALUE=100>
<PARAM NAME="ScrollPixelsY" VALUE=0>
<PARAM NAME="WidthOfPage" VALUE=3000>
<PARAM NAME="Whitespace" VALUE=100>
Flip Between Multiple URLs With Right-Mouse Click or Automation Function put__CurrentURL
<PARAM NAME="PageFlippingOn" VALUE=1>

Figure 6:
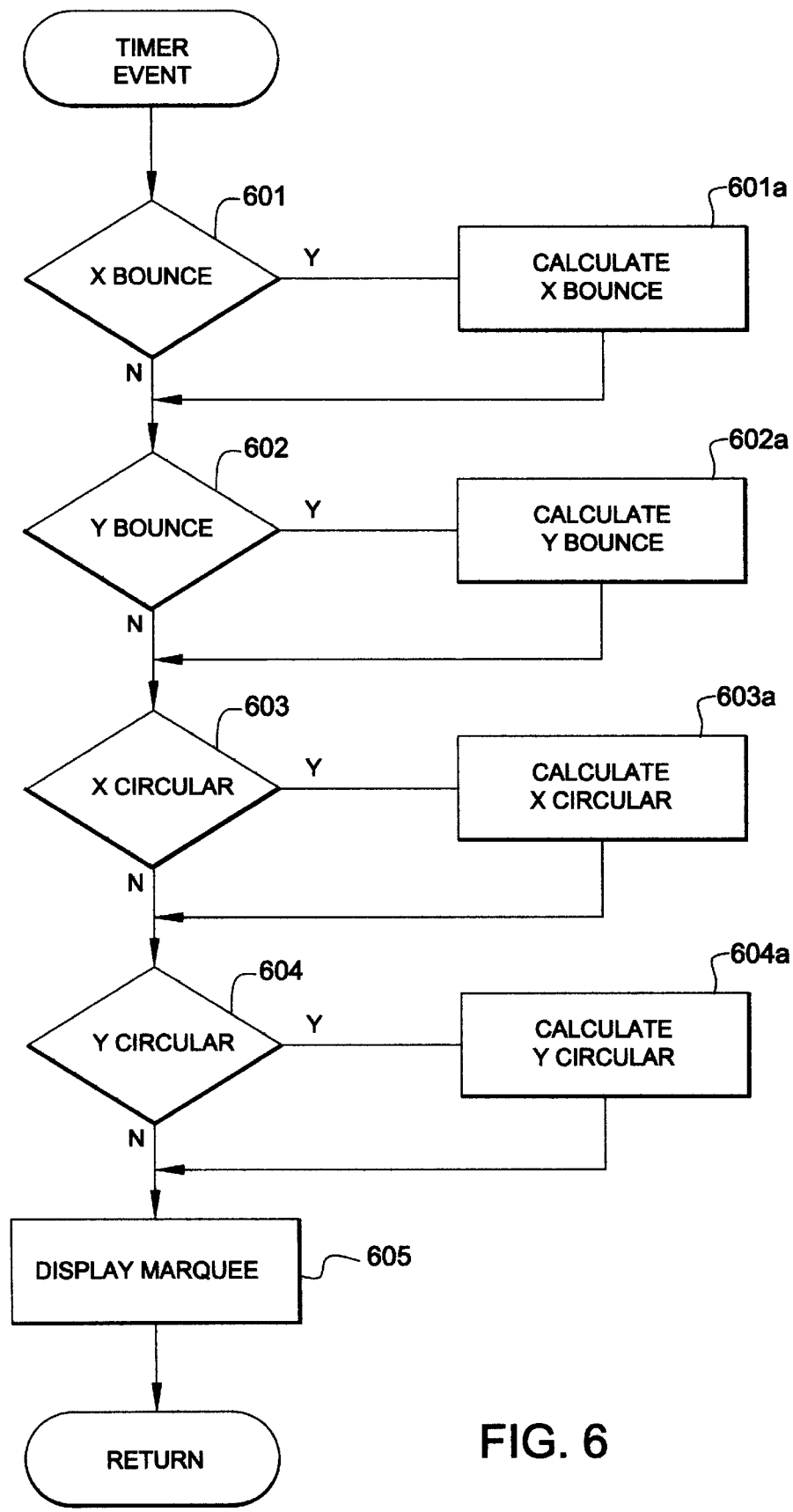
FIG. 6 is a flow diagram of an implantation of a routine to handle a timer event.

FIGS. 6–12 illustrate an implementation of portions of the marquee object. When a marquee object is initialized, it sets a timer in accordance with the scroll delay. FIG. 6 is a flow diagram of an implementation of a routine to handle a timer event. This timer event handler calculates a current XY position for the URL image and then displays the image in the window marquee. In steps 601–604, the event handler determines the scroll style and invokes the appropriate routine in steps 601a–604a to effect the scrolling. In step 605, the routine displays the scrolled image in the marquee window.

Figure 7:
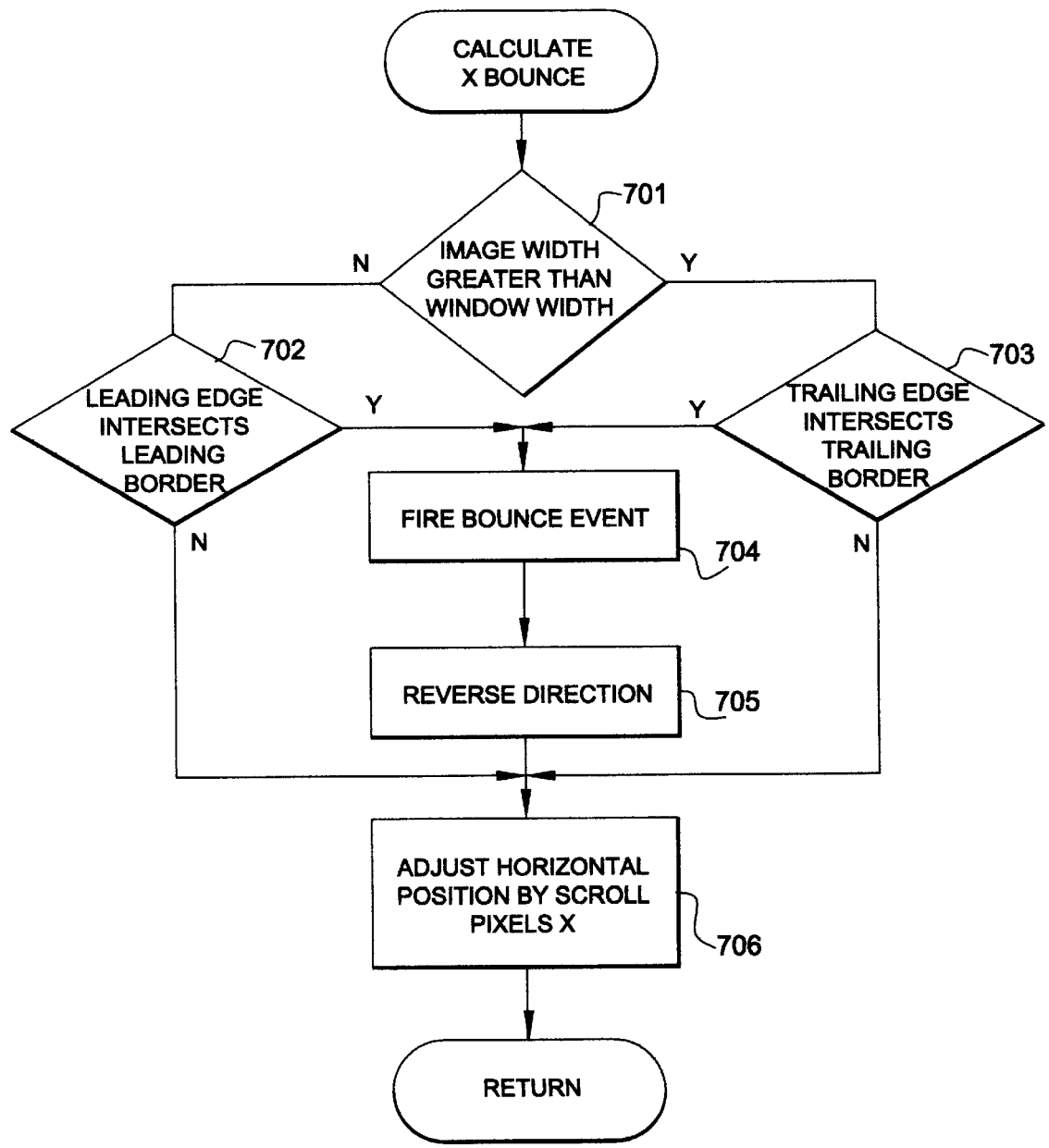
FIG. 7 is a flow diagram of an implementation of a routine to calculate the next X position when the scroll style is bounce.

FIG. 7 is a flow diagram of an implementation of a routine to calculate the next X position when the scroll style in the X scroll style is bounced. In step 701, if the image width is greater than the marquee window width, then the routine continues at step 703, else the routine continues at step 702. In step 702, if the leading edge is currently intersecting the leading border, then the image is ready to bounce and the routine continues at step 704, else the routine continues at step 706. In step 706, the routine issues the bounce event. In step 705, the routine reverses the direction scroll. In step 706, the routine adjusts the horizontal position by the ScrollPixelsX parameter and returns. In step 703, the trailing edge intersects the trailing border, then the large image is ready to bounce and the routine continues at step 704, else the routine continues at step 706.

Figure 8:
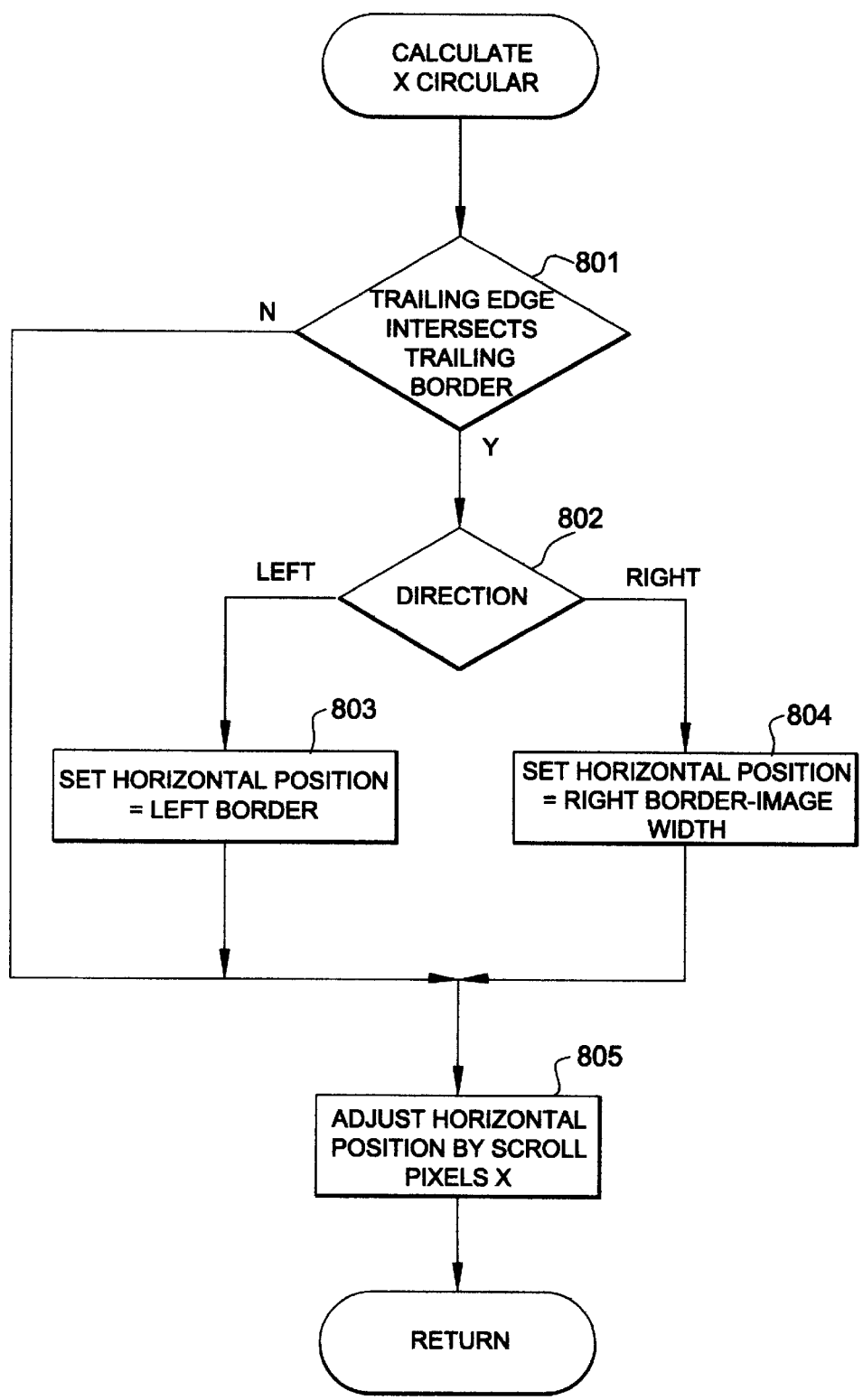
FIG. 8 is a flow diagram of an implementation of a routine to calculate the X position when the scroll style is circular.

FIG. 8 is a flow diagram of an implementation of a routine to calculate the X position when the scroll style is circular. If the trailing edge intersects the leading border, then the processing continues at step 802, else the processing continues at step 805. In step 802, if the direction is to the left, then the routine continues at step 803, else the routine continues at step 804. In step 803, the routine sets the horizontal position equal to the left border and continues at step 805. In step 804, the routine sets the horizontal position to the right border minus the image width and continues at step 805. In step 805, the routine adjusts the horizontal position by the ScrollPixelsX parameter and returns.

Figure 9:
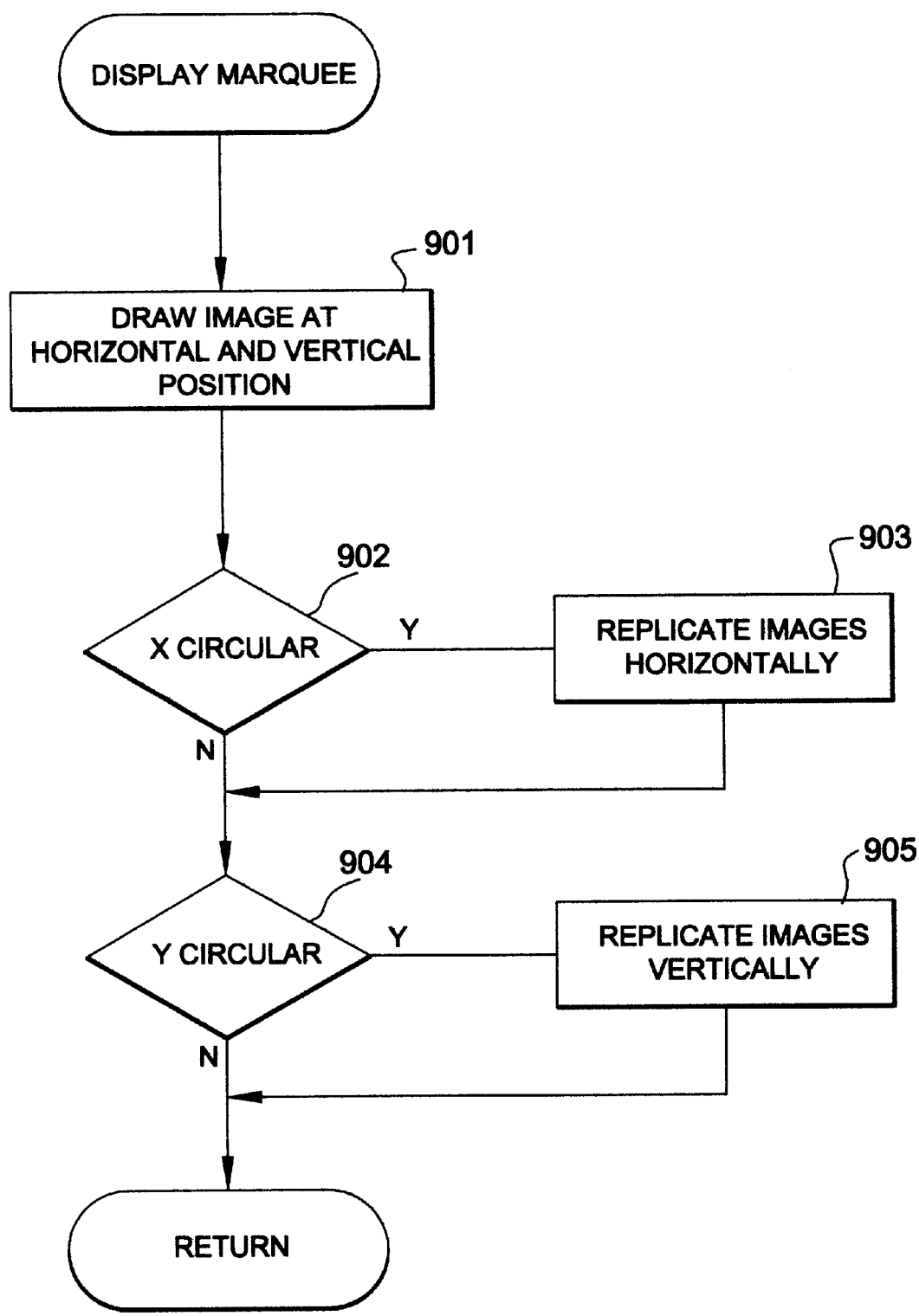
FIG. 9 is a flow diagram of an implementation of a routine to display the image within the marquee window.

FIG. 9 is a flow diagram of an implementation of a routine to display the image within the marquee. In step 901, the routine draws the image at the horizontal invertical position. In step 902, if the ScrollStyleX parameter is circular, then the routine continues at step 903 to replicate the images horizontally, else the routine continues at step 904. In step 904, if the ScrollStyleY parameter is circular, then the routine continues at step 905 to replicate the images vertically, else the routine returns.

FIG. 10 is a flow diagram of an implementation of a routine to replicate the images horizontally. In step 1001, if the window has been filled horizontally then the routine returns, else the routine continues at step 1002. In step 1002, the routine adds the appropriate whitespace after the current image. In step 1003, the routine selects the next image indicated by the URL. In step 1004, the routine displays the image in the window horizontally after the whitespace and loops to step 1001.

FIG. 11 is a flow diagram of an implementation of a routine to insert a URL into the list of URLs. The list of URLs are maintained in a table indexed by 1 to the number of URLs. The insert URL routine is passed indication of the URL and an indication of the index within the list at which the URL is to be inserted. In step 1101, the routine moves the URLs in a list whose indexes are greater than the passed index. In step 1102, the routine inserts the URL at the passed index plus 1. In step 1103, the routine increments the count of the URLs in the list and returns.

FIG. 12 is a flow diagram of an implementation of a routine to change the current URL. In step 1201, if the passed URL is less than 1 or greater than the count of URLs then an error is returned, else the routine continues at step 1202. In step 1202 if the routine sets the current URL to the passed URL and returns.

Although the present invention has been described in terms of certain embodiments, it is not intended that the invention be limited to these embodiments. Modifications within the spirit of the invention will be apparent to those skilled in the art. The scope of the present invention is defined by the claims that follow.

What is claimed is:

1. A method in a computer system for displaying a document, the method comprising:

retrieving from the document an indication that an image described by a page description language is to be displayed within a display area with a bounce visual effect, the display area having borders; and repeating the following steps to present the visual effect of bounding the image between the borders of the display area:

scrolling the image within the display area in a current direction; and when a portion of the image is scrolled to intersect a border of the display area, reversing the direction of scrolling the image within the display area so that the image scrolls in a new current direction that is reverse of the previous current direction.

2. The method of claim 1 wherein the image has a leading edge and a trailing edge and wherein when the image is smaller than the display area, reversing the direction of scrolling when the leading edge intersects a border of the display area that is in the current direction.

3. The method of claim 1 wherein the image has a leading edge and a trailing edge and wherein when the image is larger than the display area, reversing the direction of scrolling when the trailing edge intersects a border of the display area that is not in the current direction.

4. The method of claim 1 wherein the page description language is a hypertext markup language.

5. A method in a computer system for displaying a document, the method comprising:

retrieving from the document an indication that an image described by a page description language is to be displayed within a display area with a circular visual effect, the display area having borders, the image having a leading edge and a trailing edge;

scrolling a copy of the image within the display area in a direction; and repeating the following to present the visual effect of displaying the image in a circular manner within the display area:

when the trailing edge of the image is scrolled to intersect a border of the display area, scrolling another copy of the image within the display area in the direction so that the trailing edge of one copy of the image is followed by the leading edge of another copy of the image.

6. The method of claim 5 wherein the indication indicates an amount of whitespace to be inserted in between the trailing edge of one copy of the image and the leading edge of another copy of the image.

7. The method of claim 5 wherein the indication includes a reference to an HTML document and the image is generated from the HTML document.

8. The method of claim 5 wherein the page description language is a hypertext markup language.

9. A method in a computer system for animating a display of an image generated from a document described by a page description language, the method comprising:

receiving an indication of an animation type;

generating an image of the document; and repeatedly displaying the generated image within a display area to animate the image in accordance with the received animation type.

10. The method of claim 9 wherein the animation type indicates a circular display of the image.

11. The method of claim 10 wherein the image has a leading edge and a trailing edge and wherein the repeatedly displaying of the generated image effects the scrolling of the image, and wherein the trailing edge of a copy of the image is followed by a leading edge of another copy of the image.

12. The method of claim 10 wherein the image is scrolled in the display area and is followed by another copy of the image.

13. The method of claim 10 wherein the indication of animation type indicates an amount of whitespace and wherein the indicated amount of whitespace is inserted between scrolled copies of the image.

14. The method of claim 9 wherein the animation type indicates a bounce visual effect when displaying the image.

15. The method of claim 9 wherein the page description language is the hypertext markup language.

16. The method of claim 9 wherein the received animation type is scrolling and wherein the image is scrolled in accordance with a scroll delay.

17. The method of claim 16, including receiving an indication of the scroll delay.

18. The method of claim 9 wherein the received animation type is scrolling and wherein the image is scrolled in accordance with an indicated number of scroll pixels.

19. The method of claim 9 wherein the received animation type is scrolling in both horizontal and vertical directions.

20. The method of claim 19 wherein different scroll delays are indicated for the horizontal and vertical directions.

21. The method of claim 19 wherein a different number of scroll pixels are indicated for the horizontal and vertical directions.

22. The method of claim 9 wherein portions of the image are displayed immediately as the image is generated in accordance with the page description language.

23. The method of claim 9 wherein different animation types are used to animate the image in both horizontal and vertical directions.

24. The method of claim 23 wherein the animation type for the horizontal direction is scroll and the animation type for the vertical direction is bounce.

25. The method of claim 9 wherein the image is generated in accordance with a zoom factor.

26. The method of claim 9, including receiving an indication of the width of the image to be generated.

27. A method in a computer system for displaying a plurality of images within a display area, the method comprising:
for each of the plurality of images,
receiving an identification of a document described by a page description language that contains a definition of the image; and
generating an image corresponding to the identified document; and
animating each of the plurality of generated images in the display area so that one generated image is followed by another of the plurality of images.

28. The method of claim 27 wherein the page description language is the hypertext markup language.

29. The method of claim 27 wherein each image is scrolled until a user indicates to start scrolling another image.

30. The method of claim 29 wherein the user indicates to start scrolling another image by clicking on a mouse.

31. The method of claim 27 wherein the images are animated by scrolling.

32. The method of claim 27 wherein each of the plurality of images is specified by a URL.

33. The method of claim 27 wherein images can be dynamically added to the plurality of images.

34. The method of claim 27 wherein images can be dynamically removed from the plurality of images.

35. A computer system for displaying an image of a hypertext document, comprising:
a hypertext document viewer for receiving an identification of a hypertext document and for generating an image of the hypertext document;
a marquee object for receiving an identification of an hypertext document, for invoking the hypertext document viewer to generate an image of the hypertext document, and for displaying the image of the generated hypertext document; and
a browser for receiving an identification of an hypertext document that contains an indication of the marquee object along with a reference to another hypertext document and for invoking the hypertext document viewer sending the identification of the hypertext document
wherein, for each of a plurality of images, when the hypertext document viewer receives the identification of the hypertext document that contains the indication of the marquee object, the hypertext viewer sends the reference to the other hypertext document to the marquee object for generating an image of the other hypertext document and for displaying the generated image of the other hypertext document, animating each of the plurality of generated images in the display area so that one generated image is followed by another of the plurality of images.

36. The method of claim 35 wherein the marquee object stores the image of the other hypertext document and repetitively displays the image to effect the animated manner.

37. The method of claim 35 where the marquee object repetitively invokes the hypertext document viewer to effect the animated manner.

38. The method of claim 35 wherein the hypertext document is an HTML document.

39. A computer-readable medium containing instructions for causing a computer system to animate a display of an image generated from a document described by a page description language by:
receiving an indication of an animation type;
generating an image of the document; and
displaying the generated image within a display area to animate the image in accordance with the received animation type.

40. The computer-readable medium of claim 39 wherein the received animation type is scrolling and wherein the image is scrolled in accordance with an indicated number of scroll pixels.

41. The computer-readable medium of claim 39 wherein the received animation type is scrolling in both horizontal and vertical directions.

42. The computer-readable medium of claim 41 wherein different scroll delays are indicated for the horizontal and vertical directions.

43. The computer-readable medium of claim 41 wherein a different number of scroll pixels are indicated for the horizontal and vertical directions.

44. The computer-readable medium of claim 39 wherein portions of the image are displayed immediately as the image is generated.

45. The computer-readable medium of claim 39 wherein different animation types are used to animate the image in both horizontal and vertical directions.

46. The computer-readable medium of claim 45 wherein the animation type for the horizontal direction is scroll and the animation type for the vertical direction is bounce.

47. The computer-readable medium of claim 39 wherein the image is generated in accordance with a zoom factor.

48. The computer-readable medium of claim 39, including receiving an indication of the width of the image to be generated.

49. A computer-readable medium for causing a computer system to display a plurality of images within a display area, by:

for each of the plurality of images, receiving an identification of a document described by a page description language that contains a definition of the image; and generating an image corresponding to the identified document; and animating each of the plurality of generated images in the display area so that one generated image is followed by another of the plurality of images.

50. The computer-readable medium of claim 49 wherein each image is scrolled until a user indicates to start scrolling another image.

51. The computer-readable medium of claim 50 wherein the user indicates to start scrolling another image by clicking on a mouse.

52. The computer-readable medium of claim 49 wherein the images are animated by scrolling.

53. The computer-readable medium of claim 49 wherein the page description language is the hypertext markup language.

54. The computer-readable medium of claim 49 wherein each of the plurality of images is specified by a URL.

55. The computer-readable medium of claim 49 wherein images can be dynamically added to the plurality of images.

56. The computer-readable medium of claim 49 wherein images can be dynamically removed from the plurality of images.

* * * * *

UNITED STATES PATENT AND TRADEMARK OFFICE
CERTIFICATE OF CORRECTION

PATENT NO. : 6,141,018
DATED : October 31, 2000
INVENTOR(S) : Sanjay Beri et al.

Page 1 of 1

It is certified that error appears in the above-identified patent and that said Letters Patent is hereby corrected as shown below:

Column 5,
Line 61, "WidthOffPage" has been replaced with -- WidthOfPage --.

Column 8,
Line 22, -- 0 -- has been inserted after the word "VALUE=".

Column 11, claim 13,
Line 1, "Claim 10" has been replaced with -- Claim 12 --.

Signed and Sealed this

Twentieth Day of November, 2001

*Attest:*

*Nicholas P. Godici*

NICHOLAS P. GODICI
*Attesting Officer  Acting Director of the United States Patent and Trademark Office*